Oct. 9, 1956     C. W. TYDEMAN     2,765,808
VALVES FOR THE CONTROL OF HYDRAULIC MACHINERY
Filed Sept. 11, 1953     2 Sheets-Sheet 1
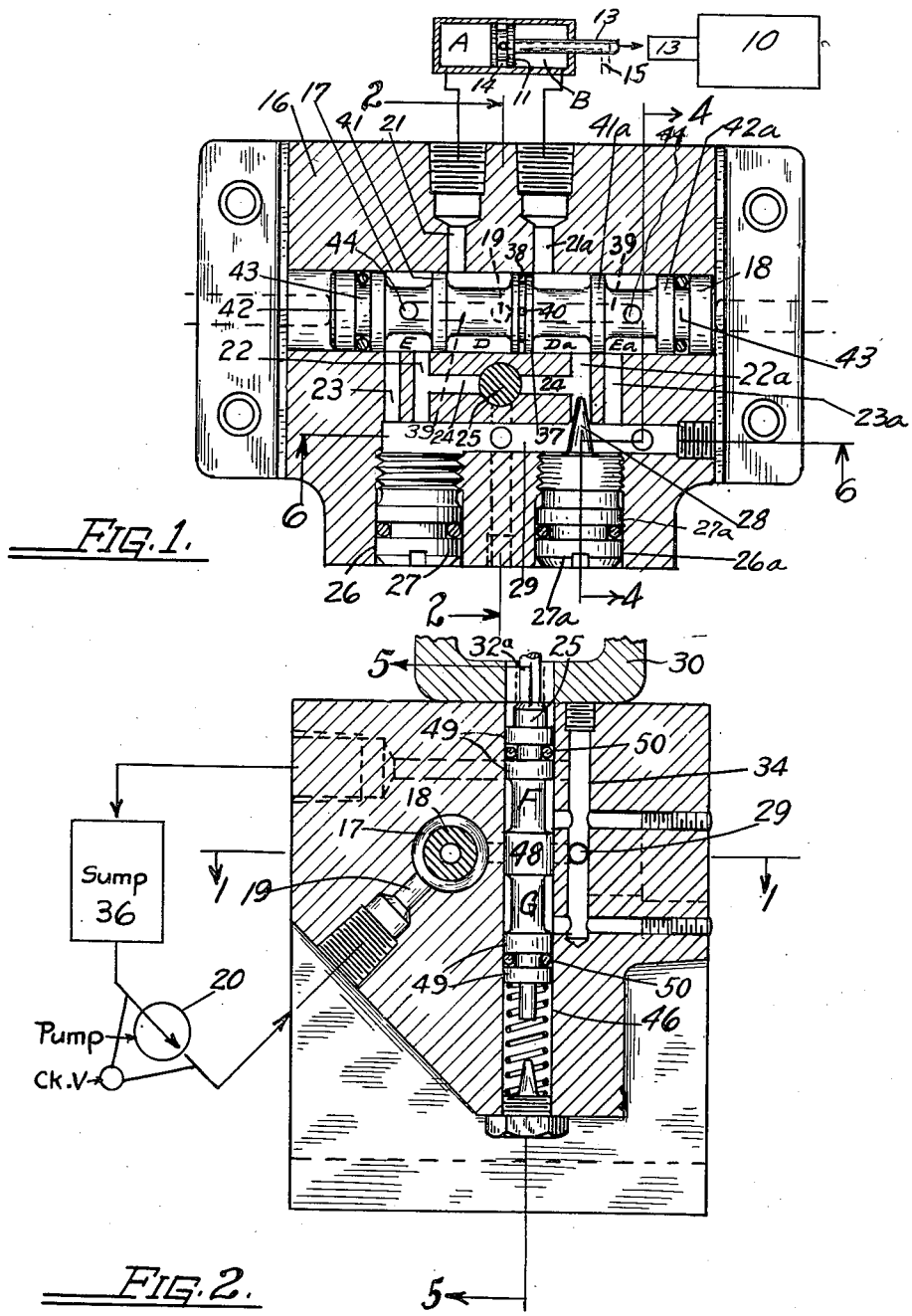
INVENTOR.
Clarence W. Tydeman Oct. 9, 1956        C. W. TYDEMAN        2,765,808
VALVES FOR THE CONTROL OF HYDRAULIC MACHINERY
Filed Sept. 11, 1953        2 Sheets-Sheet 2
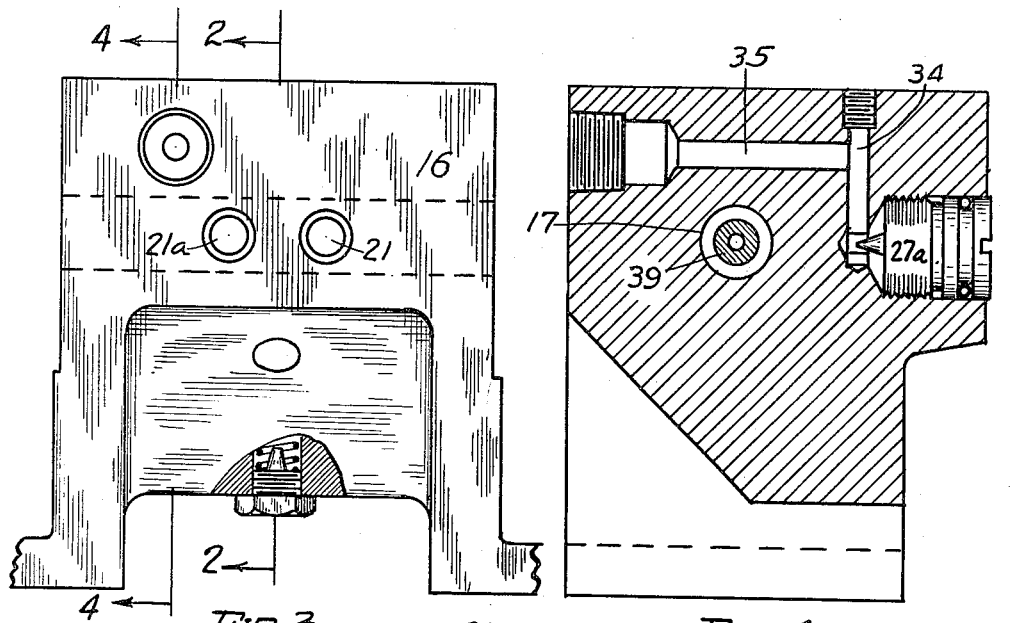
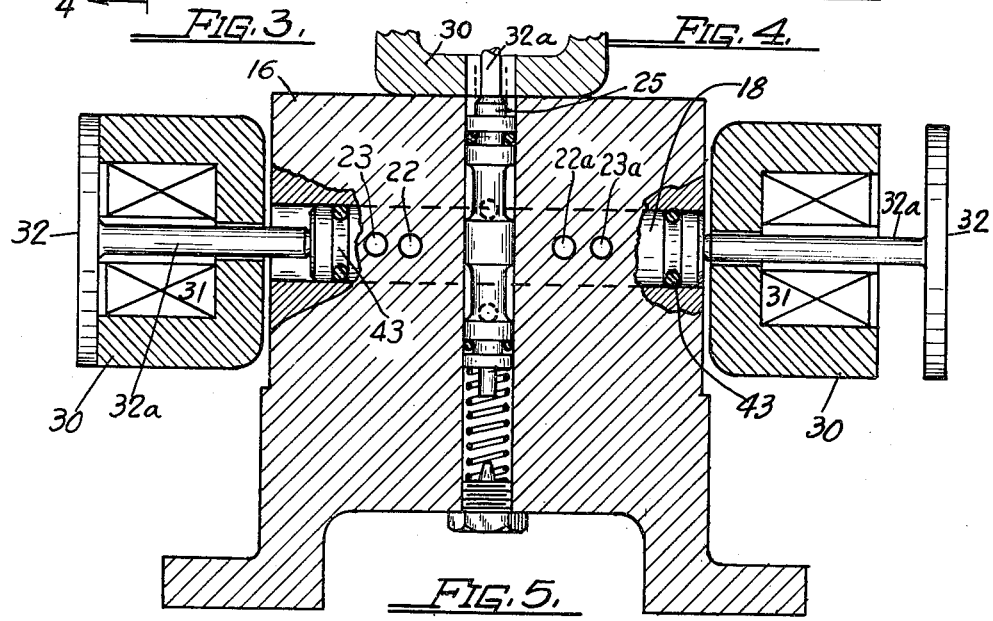
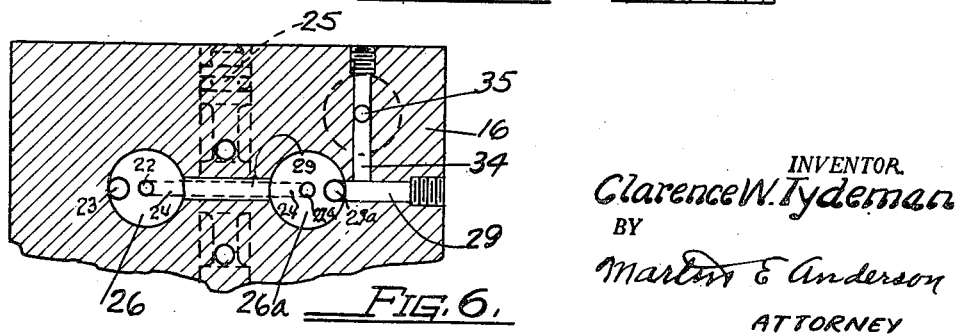
INVENTOR.
Clarence W. Tydeman
BY
Martin E. Anderson
ATTORNEY

United States Patent Office 2,765,808
Patented Oct. 9, 1956

2,765,808

VALVES FOR THE CONTROL OF HYDRAULIC MACHINERY

Clarence Walter Tydeman, Redwood City, Calif.

Application September 11, 1953, Serial No. 379,667

9 Claims. (Cl. 137—622)

This invention relates to improvements in pilot valves for use in controlling the direction and speed of movement of a hydraulic ram piston and is in the nature of an improvement on the similar valve described and claimed in applicant's co-pending application Serial Number 324,805 filed December 8, 1952, now abandoned.

In many different machine operations it is frequently necessary to impart a uniform movement to a tool and to apply to it a powerful force. It is also desirable to control the forward speed of the tool so that it will move at the optimum speed while performing a machine operation on one part of the article machined and to move quickly over an intervening space until it reaches another part that requires a slower movement of the tool and finally reverse the movement at a high speed.

In the application above identified a control valve operating in the manner described has been shown, described and claimed. The valve forming the subject matter of the above identified application has been successfully operated for some time and where the pressure of liquid (usually an oil) is moderate the valve functions in a satisfactory manner. When the pressures used are of the order of 800 pounds per square inch and more, certain seals, employing the well known O-ring sealing element, increase greatly the frictional resistance offered to the movement of the movable valve, all as will be herein described.

This invention relates to an improvement which eliminates the increase in the frictional resistance to movement of the slide valve due to the increase in the pressure of the liquid controlled by the valve.

The valve to which this invention relates will now be described in detail for which purpose reference will be had to the accompanying drawing in which the invention has been illustrated and in which:

Figure 1 is a section through the pilot valve and control assembly taken on line 1—1, Figure 2;

Figure 2 is a section taken on line 2—2, Figures 1 and 3;

Figure 3 is a rear elevational view with a small portion thereof broken away and shown in section;

Figure 4 is a section taken on line 4—4, Figures 1 and 3;

Figure 5 is a section taken on line 5—5, Figure 2; and

Figure 6 is a fragmentary section taken on line 6—6, Figure 1.

Referring now to the drawing and more particularly to Figures 1 and 2 thereof, reference numeral 10 designates a reciprocable part of a machine such as the table of a shaper or planer, or the boring bar of a boring machine or any other part or member whose motion is to be controlled, and reference numeral 11 designates a piston mounted for reciprocation in a cylinder 12. A piston rod 13 connects the piston with the machine or machine tool to be controlled. The piston has a peripheral groove 14 between its ends and this is in communication with the axial opening 15 in the piston rod and any liquid that enters groove 14 is vented to the outside of the cylinder so that liquid leaking from compartment A can not enter compartment B or in the opposite direction but will be vented to a sump outside of the cylinder.

The control or pilot valve

The movement of piston 11 is controlled by a pilot valve assembly to the improved construction of which this invention relates and which will now be described.

The control valve consists of a cast steel body 16, preferably of the shape shown in the drawing, and has a rectangular cross section as shown most clearly in Figure 1. The valve body has a slide valve opening 17 in which is mounted for reciprocation a piston type slide valve which has been designated in its entirety by numeral 18. The valve body has several port openings that communicate with the slide valve opening. The intake port 19 is in communication with the outlet port of a high pressure pump 20 and opens into the slide valve opening substantially at its middle point, as shown most clearly in Figure 1. There are two outlet ports 21 and 21a that are in communication respectively with chambers A and B in cylinder 12. In addition to the three ports mentioned there are two exhaust ports 22 and 22a and two leakage ports 23 and 23a. The two exhaust ports are joined by a quick traverse port 24 that is opened and closed by a quick traverse valve 25 whose construction and purpose will be hereinafter described. The valve body is also provided with two needle valve openings 26 and 26a that are in axial alignment with the exhaust ports 22 and 22a respectively. The inner ends of the needle valve openings are threaded for operative engagement with the cylindrical bodies of the valve members 27, 27a (27 is not shown). The last mentioned valve members terminate in tapered valve members 28 that enter the exhaust ports and control the effective openings therein. Openings 26 and 26a are interconnected by passage 29. Slide valve 18 is shifted between its two operative positions by means of electric solenoids like those that have been indicated in a general way in Figure 5, where reference numeral 30 designates the iron core; 31 the coil; 32 and 33 and 33a the armature. The magnets are, of course, attached to the body by suitable screws and when they are energized they shift the slide valve to the desired position; the solenoid at the left shows the position of the ports after the solenoid has functioned. The solenoid coils are, of course, connected in electric circuits controlled by suitable micro switches and relays which have not been shown on the drawing.

Attention is now directed to Figures 1 and 2 from which it will be seen that when the pump is operating and delivering oil or other fluid through intake port 19 it will flow through outlet port 21 into cylinder chamber A and will exert a force on the piston which tends to move it in a direction to decrease the volume of chamber B. Liquid from chamber B will seek outlet through ports 21a and 22a and will pass into opening 29 after passing the needle valve 28. The rate at which the piston moves towards the right, if there is no leakage, depends on the rate at which liquid can pass the needle valve. The liquid that passes the needle valve into passage 29 will flow upwardly through passage 34 into passage 35 and to the sump 36.

Attention is now directed especially to Figure 1 and to slide valve 18 which has as tight a sliding fit in opening 17 as practical. Central wall 37 has a peripheral groove 38 that communicates with the axial opening 39 by one or more radial openings 40.

The slide valve has four sections D, Da and E, Ea of reduced diameter. Sections D and E and Da and Ea being separated by walls 41 and 41a respectively. Sections E and Ea terminate at the end walls 42 and 42a which are each provided with a groove 43 for the reception of a seal of the type usually referred to as an O-ring. Openings 44 communicate the axial opening 39 with sections E and E*a* as shown.

From Figure 1 it will be seen that section D is of such length that it embraces intake port 19 and outlet port 21 while section D*a* communicates port 21*a* with exhaust port 22*a*. Reduced section E is in communication with exhaust port 22 and with leak port 23, and at the same time section E*a* is in communication with leak port 23*a* only.

Since the slide valve is symmetrical with respect to groove 38 and since the ports on both sides of intake port 19 are symmetrically arranged with the intake port the arrangement just described will be the same as above described but reversed.

Operation

Let us now assume that the parts are in the position shown in Figure 1 and that oil or other liquid is delivered at high pressure and enters the slide valve opening through port 19. The fluid will enter chamber A and exert a pressure on the piston tending to move it towards the right and decrease the volume of chamber B, which, with all communicating passages will be assumed to be completely filled with liquid. The speed at which the piston can move will then depend on the rate at which the liquid can pass the needle valve, as above explained.

Since there is always a difference in the pressure of the liquid on opposite sides of center wall 37 of the slide valve and opposite sides of the piston such leakage will affect the speed at which the piston moves, other things being equal. The leakage tending to cross piston 11 is vented to the outside as above explained.

Any liquid that would ordinarily leak past central wall 37 of the slide valve will enter groove 38 and be conducted to sections E and E*a* which are always in communication with leak passage 35 and is discharged into the sump. It is therefore evident that no high pressure will be built up in chambers E and E*a* because any leakage at the points mentioned will be discharged at atmospheric pressure and will not affect the speed at which the piston moves.

There are times when a rapid movement of the piston is desired, as for example, if it is employed to reciprocate a planer or shaper table which must move fast in one direction. This quick traverse is effected by establishing a communication between the exhaust passages 22 or 22*a* with passage 29. Whereupon the exhaust liquid by-passes the needle valve and permits the piston to move rapidly. To effect this diversion of the exhaust liquid the quick traverse or diverter valve 25 has been provided and reference will now be had more particularly to Figures 2, 5 and 6 for a detailed description of this valve and its operation. The valve body has a diverter valve opening 46 whose axis intersects the axis of passage 24 and is perpendicular thereto and also perpendicular to the top of the valve body as shown most clearly in Figure 2. This valve is urged upwardly by spring 47 and when in the position shown has its upper end in engagement with the magnet core 32*a*. This valve has two sections F and G of a smaller diameter than the center wall 48 and the ends 49 each have a groove 50 for the reception of an O-ring seal.

When valve 25 is in the position shown in Figures 2 and 5 the center wall 48 separates the passage 24 (Figure 1) into two sections. Whenever a rapid traverse of the piston and the tool or element it controls is desired, the solenoid controlling the core 32*a* shown in Figures 2 and 5 is energized, whereupon the liquid has a free passage from the cylinder to the sump. When valve 25 is in the position shown some liquid from the high pressure exhaust passage will leak by the valve and come into sections F and G and flow through the passages shown in Figure 2 into passage 29 and from thence to the sump.

In cases where the valve is employed to control the flow of oil to a hydraulic ram whose sole function is to exert heavy pressure without regard to speed the quick traverse valve can be left open or the needle valves can be left in wide open position. The valve will then operate like an ordinary piston type slide valve with wide open exhaust ports. Since the reduced diameter sections E and E*a* are always in communication with the leakage ports or with both the leakage ports and the adjacent main exhaust port there will at no time be fluid at high pressure present in reduced diameter sections E and E*a* and, therefore, the O-rings in grooves 23 will not be subjected to sufficient pressure to distort them sufficiently to produce any change in the frictional resistance to movement of the valve therefore remains substantially constant regardless of the pressure controlled by the valve. This feature, as has been pointed out, is important in any slide valve used for controlling fluid at high pressure.

Attention will now be called to an extremely important improvement which can best be explained when reference is had to Figure 1. In the employment of this control valve the slide valve must be shifted from time to time and this is effected by the solenoids shown in Figure 5. In the application above identified the O-rings are at all times subjected to high pressure which distorts them and forces them against the wall of the slide valve opening with great force creating a great frictional resistance to movement.

In the present construction reduced sections E and E*a* are so long that they are always in communication with the ports 23, 23*a* as shown in Figure 1. Since the O-ring seals are positioned beyond the ends of sections E, E*a* they are never subjected to high pressure because the areas E and E*a* are always in communication with the atmosphere and any leakage liquid will therefore pass on to the sump. Any leakages past wall 41 and 41*a* will enter the annular spaces E and E*a* and pass out through ports 23, 23*a* and as a result the O-ring seals will not have to withstand any appreciable pressure and the valve can therefore be shifted easily regardless of the liquid pressure employed. The diverter valve has its cylindrical chambers F and G vented to the atmosphere at all times and will therefore move freely under all pressure conditions.

Leakage at the piston that is directed to the atmosphere does not affect the speed control nor will leakage from the intake and/or the exhaust chamber D and/or D*a* into groove 38 and to the sump affect the control. Since an ample liquid supply is always available the slight leakage that takes place is of no material consequence. With the present construction the valves shift easily and respond immediately to the action of the solenoids which assures a reliable operation at all times.

This application is a continuation in part of my co-pending application above identified.

What I claim as new is:

1. A control valve comprising a valve body having a slide valve receiving opening and an intake port adapted to receive liquid under high pressure, and two outlet ports communicating points of the slide valve opening positioned on opposite sides of the intake port with the outside of the valve body, said valve body having two main exhaust ports communicating points spaced beyond the outlet ports with the outside of the body, valve means operatively associated with each main exhaust port to restrict the flow of fluid therethrough, the body having two leak passages one positioned adjacent to and spaced beyond each of the main exhaust passages, said leak passages communicating with the outside of the valve body, a slide valve in the slide valve receiving opening in sealed sliding engagement therewith, said valve having two spaced portions of reduced diameter, of a length to effect a communication between the intake port and one outlet port, depending on the position of the valve, the distance between the outlet ports and the corresponding main exhaust ports being such that when the valve is in position to communicate the intake port with one outlet port the other outlet port will be in communication with a main exhaust port, the slide valve having a section of reduced diameter beyond each of the first mentioned sections of reduced diameter, so positioned relative to said exhaust and leak passage that when the slide valve is in position to direct liquid into one of the outlet ports the corresponding end section of reduced diameter will embrace both the corresponding exhaust and leak passages and simultaneously therewith the other first mentioned section of reduced diameter will communicate the other outlet port with the corresponding main exhaust port while the corresponding end section of reduced diameter will be in communication with the corresponding leak passage, the part of the valve that separates the first mentioned sections of reduced diameter having a groove in its peripheral surface, the slide valve having an axial opening communicating said groove with the outermost sections of reduced diameter, whereby any leakage from the two first mentioned sections will always pass into the outermost sections of reduced diameters and into the leak ports, whereby the liquid pressure in said outermost sections will always remain low, each of the main exhaust passages having a passage restricting valve operatively associated therewith.

2. A device in accordance with claim 1 in which means comprising an electromagnetically operable valve mechanism is provided for interconnecting the leak passages with the main exhaust passages at a point between the slide valve opening and the passage restricting valve to form a by-pass about said valves.

3. A device in accordance with claim 2 in which the slide valve is provided with peripheral grooves beyond the outermost sections of reduced diameter for the reception of a seal ring.

4. A control valve comprising a valve body having a slide valve receiving opening and an intake port adapted to receive liquid under high pressure, and two outlet ports communicating points of the slide valve opening positioned on opposite sides of the intake port with the outside of the valve body, said valve body having two main exhaust ports communicating points spaced beyond the outlet ports with the outside of the body, which is also provided with two leak passages one positioned adjacent to and spaced beyond each of the main exhaust passages, said leak passages communicating with the outside of the valve body, a slide valve in the slide valve receiving opening in sealed sliding engagement therewith, said valve having two spaced portions of reduced diameter, of a length to effect a communication between the intake port and one outlet port, depending on the position of the valve, the distance between the outlet ports and the corresponding main exhaust ports being such that when the valve is in position to communicate the intake port with one outlet port the other outlet port will be in communication with a main exhaust port, the slide valve having a section of reduced diameter beyond each of the first mentioned sections of reduced diameter, so positioned relative to said exhaust and leak passage that when the slide valve is in position to direct liquid into one of the outlet ports the corresponding end section of reduced diameter will embrace both the corresponding exhaust and leak passages and simultaneously therewith the other first mentioned section of reduced diameter will communicate the other outlet port with the corresponding main exhaust port while the corresponding end section of reduced diameter will be in communication with the corresponding leak passage.

5. A motor valve of the slide valve type for controlling the reciprocation of a piston in a double acting hydraulic ram cylinder comprising, a valve body having a valve opening extending therethrough, a slide valve in the opening in slidable sealing engagement with the opening wall, the valve body having a high pressure inlet port in communication with said opening, two outlets ports communicating with said opening on opposite sides of the inlet port, two main exhaust passages in communication with the valve opening at spaced points beyond the outlet ports, the slide valve having two spaced portions of decreased diameter, the length of each portion being such that it will form a communication between the inlet port and one of the outlet ports, whereby either outlet port can be put into communication with the inlet port by shifting the valve axially, each exhaust passage having associated therewith valve means for restricting the effective discharge opening therethrough, the slide valve having an axial opening, that part between the portion of decreased cross section having a groove in its outer surface, there being a passage from the groove to the axial opening, at least one end of the axial opening being open to the atmosphere, whereby any liquid tending to flow from one side of the part between portions of decreased cross section to the other will enter the groove and be discharged under atmosphere pressure, said valve body having a leak passage in communication with the atmosphere, positioned adjacent each main exhaust passage, and an electromagnetically operated valve means for effecting communication between said passages at points between the valve opening and the passage restricting valve to provide a by-pass about the latter.

6. A motor valve of the slide valve type for controlling the flow of liquid to opposite sides of a piston in a hydraulic ram cylinder comprising, a valve body having a cylindrical opening for the reception of a cylindrical slide valve having two portions of reduced diameter separated by a central valve section having a peripheral groove in its outer surface, the valve body having an intake port and two outlet ports in communication with the cylindrical opening, the intake port being positioned between the outlet ports, said portions of reduced diameter having a length sufficient to communicate the intake port with either one of the outlet ports, two main exhaust ports in communication with said opening at points spaced from the outlet ports a distance such that when the intake port is in communication with one of the outlet ports the other outlet port will be in communication with one of the exhaust ports, means comprising adjustable valves for controlling the effective area of the exhaust ports, the portions of the slide valve beyond the sections of reduced diameter having peripheral grooves, the slide valve having an axial opening communicating both last named peripheral grooves with the peripheral groove in the central valve section, the valve body having leak passages in communication with the valve opening at points spaced beyond the main exhaust port passages so that when a portion of reduced area is in position to communicate one of the outlet ports with the corresponding exhaust port the corresponding peripheral groove will be in communication with the corresponding leak passage, the latter opening to the atmosphere, an adjustable passage restricting valve operatively associated with each main exhaust passage, and means comprising an electromagnetically operated valve operatively associated with each pair of main and leak passages to provide a by-pass about the passage restricting valve.

7. A high pressure control device of the slide valve type comprising a valve body having a cylindrical opening extending therethrough, a high pressure intake port in communication with the said opening intermediate its ends, two outlet ports in communication with the said opening on opposite sides of the intake port, two exhaust ports in communication with said opening at points beyond the outlet ports, means comprising adjustable valves of the needle valve type for controlling flow of liquid through the exhaust ports, leak passages communicating points beyond the exhaust ports with the outside of the valve body, valve means positioned in the exhaust port passages between the said opening and the needle valves for effecting a communication between the exhaust port passages and the leak passages, a slide valve operatively mounted in the cylindrical opening, said valve having two sections of smaller diameter on opposite sides of an intermediate portion, the latter portion having a circular groove, the slide valve having an axial opening in communication with the said groove, the parts of the slide valve beyond the sections of decreased diameter having peripheral grooves in communication with the axial opening, and means for reciprocating the slide valve in the opening to alternately place the intake port in communication with the two outlet ports and with the two exhaust ports, the ports being so proportioned and arranged that when either section of decreased diameter communicates one of the outlet ports with the corresponding exhaust port the corresponding groove that communicates with the axial opening will be in communication with the corresponding leak passage port, whereby any liquid leaking from a section of smaller diameter towards the other similar section will flow into the axial opening and be conducted to the corresponding leak passage port.

8. A motor valve of the slide valve type for controlling the movements of the piston in a hydraulic ram mechanism comprising, a valve body having a cylindrical opening for the reception of a slide valve of the piston type, the valve body having a high pressure liquid supply passage terminating in an inlet port, two outlet passages terminating in outlet ports positioned on opposite sides of the inlet port, two exhaust passages terminating in exhaust ports positioned beyond the outlet ports, a leakage discharge passage positioned beyond each exhaust passage having port openings in communication with the said cylindrical opening, a slide valve of the piston type operatively positioned in the cylindrical opening, said valve having two portions of reduced diameter positioned on opposite sides of an intermediate portion, the lengths of the reduced portions being such that they can communicate the inlet port with either outlet port, the exhaust ports being spaced outwardly from the outlet ports a distance not greater than the length of the reduced diameter portion of the valve, that portion of the slide valve between the portions of reduced diameter having a peripheral groove in its surface, the slide valve having an axial opening in communication with said groove, the slide valve having each end provided with a groove positioned to register with one of the leakage passage ports when the corresponding exhaust port is in communication with the corresponding outlet port, the last named groove being in communication with the axial opening, adjustable valve means for controlling the rate at which fluid can flow through the exhaust passage, valve means for communicating the exhaust passages with the corresponding leakage passages, and electromagnetic means for shifting the slide valve in its opening to effect a communication between the inlet port and either one of the outlet ports.

9. A control valve comprising a valve body having a slide valve receiving opening and an intake port adapted to receive liquid under high pressure, and two outlet ports communicating points of the slide valve opening positioned on opposite sides of the intake port with the outside of the valve body, said valve body having two main exhaust passages communicating points spaced beyond the outlet ports with the outside of the body which is also provided with two leak passages one positioned adjacent to and slightly beyond each of the main exhaust passages, said leak passages communicating with the outside of the valve body, a slide valve in the slide valve receiving opening in sealed sliding engagement therewith, said valve having two spaced portions of decreased diameter, of a length to effect a communication between the intake port and one outlet port, depending on the position of the valve, the distance between the outlet ports and the corresponding main exhaust ports being such that when the valve is in position to communicate the intake port with one outlet port the other outlet port will be in communication with a main exhaust port, the slide valve having a section of reduced diameter beyond each of the first mentioned sections of reduced diameter, so positioned relative to the said leak passages that when the valve is positioned to communicate the inlet port with one of the outlet ports the corresponding main exhaust passage will be closed by that portion of the valve between the first mentioned section of reduced diameter and the corresponding second mentioned section of reduced diameter and the last mentioned section being in communication with the corresponding leak passage, the slide valve having an axial opening inter-communicating the said outermost sections of reduced diameter, that portion of the slide valve between the first mentioned sections of reduced diameter having a groove in communication with the axial opening, each of the main exhaust passages having an adjustable valve operatively associated with it to control the rate at which exhaust fluid can pass, and an electromagnetically operable valve means operatively associated with each main exhaust passage and the adjacent leak passage at a point between the slide valve opening and the said adjustable valve to effect a direct passage from the main exhaust passage to the corresponding leak passage.

References Cited in the file of this patent

UNITED STATES PATENTS

| | | |
|---|---|---|
| 1,339,939 | Alter | May 11, 1920 |
| 1,431,101 | Dineen | Oct. 3, 1922 |
| 2,365,987 | Zimmerman | Dec. 26, 1944 |
| 2,392,074 | Wasson | Jan. 1, 1946 |
| 2,416,933 | Lynam | Mar. 4, 1947 |
| 2,570,896 | Winchester | Oct. 9, 1951 |
| 2,621,676 | Loft | Dec. 16, 1952 |